United States Patent [19]

Inoue

[11] Patent Number: 4,596,916

[45] Date of Patent: Jun. 24, 1986

[54] PARTING-LINE EDM WITH SELECTIVELY ACTUATED FLUID FLOWS

[75] Inventor: Kiyoshi Inoue, Tokyo, Japan

[73] Assignee: Inoue-Japax Research Incorporated, Kanagawaken, Japan

[21] Appl. No.: 592,113

[22] Filed: Mar. 22, 1984

[30] Foreign Application Priority Data

Mar. 23, 1983 [JP] Japan .................. 58-48382

[51] Int. Cl.[4] .............................. B23H 1/10
[52] U.S. Cl. .............................. 219/69 D; 204/129.6; 219/69 M
[58] Field of Search ................. 219/69 D, 69 E, 69 M, 219/68, 69 R; 204/129.6, 129.65, 224 R, 284, 306

[56] References Cited

U.S. PATENT DOCUMENTS

| | | | |
|---|---|---|---|
| 2,909,641 | 10/1959 | Kucya | 219/69 E |
| 3,120,601 | 2/1964 | Berlin et al. | 219/69 E |
| 3,154,664 | 10/1964 | Zeder, Jr. | 219/69 M |
| 3,240,914 | 3/1966 | Hill et al. | 219/69 E |
| 3,276,988 | 10/1966 | Williams | 204/284 |
| 3,436,331 | 4/1969 | Dietz et al. | 219/68 |
| 3,963,588 | 6/1976 | Glenn | 204/224 R |
| 4,289,947 | 9/1981 | Inoue | 204/129.6 |
| 4,296,301 | 10/1981 | Johnson | 1219/69 M |
| 4,471,199 | 9/1984 | Michishita et al. | 219/69 E |

FOREIGN PATENT DOCUMENTS

| | | | |
|---|---|---|---|
| 2232551 | 1/1973 | Fed. Rep. of Germany | 219/69 D |
| 2901712 | 8/1979 | Fed. Rep. of Germany | 219/69 D |
| 145194 | 12/1978 | Japan | 219/69 C |
| 55-65035 | 5/1980 | Japan | 219/69 D |
| 137846 | 10/1980 | Japan | 219/69 D |
| 146631 | 11/1981 | Japan | 204/129.6 |
| 26504 | of 1913 | United Kingdom | 204/224 R |
| 2080176A | 2/1982 | United Kingdom | 219/69 M |
| 806333 | 2/1981 | U.S.S.R. | 219/69 R |

Primary Examiner—Clarence L. Albritton
Assistant Examiner—Geoffrey S. Evans
Attorney, Agent, or Firm—Karl F. Ross; Herbert Dubno

[57] ABSTRACT

A method of and an apparatus for machining interfitting members to improve their fit wherein the members are positioned to place their surfaces to be interfitted in a complementary relationship with a small gap spacing therebetween. A fluid delivery assembly includes a manifold supplied with a pressurized EDM liquid medium from a source thereof and a plurality of nozzles having each a respective valve and commonly projecting from the manifold. The nozzles have their respective nozzle outlets arranged in an array so as to be disposed individually adjacent to and distributed uniformly in the array along a continuous opening or slit formed as a continuous, narrow and elongate outlet opening of the gap spacing between the members where the surfaces to be interfitted terminate. A control unit sequentially opens the valves in a predetermined order, determined according to a particular surface characteristic of the surfaces which impedes a desired interfit therebetween, to allow the pressurized liquid medium in the manifold to be delivered sequentially to flush therewith particular areas in the gap spacing from the corresponding nozzle outlets. An EDM system having an EDM power supply and a servo system for relatively advancing the members effects electrical discharges successively in the particular areas mentioned, to sequentially remove the surface characteristic until the surfaces establish the desired interfit.

6 Claims, 5 Drawing Figures

PARTING-LINE EDM WITH SELECTIVELY ACTUATED FLUID FLOWS

FIELD OF THE INVENTION

The present invention relates generally to parting-line EDM (electrical discharge machining) and, more particularly, to an improved method of and apparatus for machining interfitting members, by means of EDM, to improve the conformity or fit therebetween, i.e. the so-called "parting line".

BACKGROUND OF THE INVENTION

It is known that the EDM capability of selectively removing surface projections makes the process highly suitable for efficiently machining the parting line of interfitting or mating members, e.g. tools, dies and molds, to remove excess material which impedes a close fit therebetween as required. However, the earlier efforts to successfully utilize the EDM process for these applications have often proved to be unsatisfactory and have left much to be desired. Difficulties especially arise where the interfitting members are large or the surfaces to be interfitted are large in area so that a commercially available or standard EDM machine is inappropriate. Then, not only must a mechanical structure be provided which is adequate to carry the heavy members that may each have a weight of tons and to move them for necessary positioning operations, but a fine servo adjustment is necessary to accurately maintain their relative position. It has been believed to be indispensible to have a high-capacity fluid supply and handling unit including a large worktank necessary to accommodate the large members dipped in the EDM liquid medium as well as high-rate pump, filter and fluid circulating conduits. High operating costs would be required, inter alia, because of the large volume of the EDM liquid medium required to fill and circulate through the large tank. The EDM liquid is indispensable as a medium for sustaining electrical discharges, to assure prompt gap recovery, to cool and carry away EDM products and debris, and to cool the members heated by the electrical discharges.

OBJECTS OF THE INVENTION

Accordingly, the present invention seeks to provide an improved parting-line EDM method which enables large interfitting members to be machined without difficulty, which may be carried out utilizing existing equipment or in a machine in which the members machined are to be utilized, and which eliminates the need for a high-capacity fluid supply and handling unit while permitting the members to be machined much more economically than heretofore.

The present invention also seeks to provide an improved parting-line EDM apparatus which, for machining a given pair of interfitting members, may basically make use of existing equipment or a machine in which the members machined are to be utilized and which can drastically reduce the volume of an EDM liquid medium needed.

SUMMARY OF THE INVENTION

In accordance with the present invention there is provided, in a first aspect thereof, a method of machining a pair of electrically conductive, interfitting members to improve the conformity therebetween, which method comprises: positioning the members to place their surfaces to be interfitted in a generaly interfitting relationship with a small spacing therebetween, disposing a plurality of separate fluid delivery nozzles so as to arrange their respective nozzle outlets individually adjacent to and substantially distribute them uniformly in an array along a continuous opening formed as a continuous, narrow and elongate outlet opening of the gap spacing between the said members where the surfaces terminate thereon, the separate nozzles having each a respective valve and commonly projecting from a manifold supplied with a pressurized electrical discharge machining liquid medium; and sequentially opening the valves in a predetermined order, determined according to a particular surface characteristic of the surfaces which impedes a desired interfit therebetween, to allow the pressurized liquid medium in the manifold to be delivered sequentially to flush therewith particular areas in said gap spacing from the corresponding nozzle outlets while effecting electrical discharges successively in the said areas to sequentially remove the surface characteristic, until the surfaces establish the desired interfit.

The invention also provides, in a second aspect thereof, an apparatus for machining a pair of electrically conductive, interfitting members to improve their conformity, which apparatus comprises: means for positioning the members to place their surfaces to be interfitted in a generally interfitting relationship with a small gap spacing therebetween; a fluid delivery assembly comprising a manifold adapted to be supplied with a pressurized electrical discharge machining liquid medium from a source thereof and a plurality of separate nozzles having each a respective valve and commonly projecting from the manifold, the separate nozzles having their respective nozzle outlets arranged in an array so as to be disposed individually adjacent to and distributed substantially uniformly in the array, along a continuous opening formed as a continuous, narrow and elongate outlet opening of the gap spacing between the members where the said surfaces to be interfitted terminate; control means for sequentially opening the valves in a predetermined order, determined according to a particular surface characteristic of the said surfaces which impedes a desired interfit therebetween, to allow the pressurized liquid medium in the said manifold to be delivered sequentially to flush therewith particular areas in the gap spacing from the corresponding nozzle outlets; and means for effecting electrical discharges successively in the areas to sequentially remove the said surface characteristic until the said surfaces establish the desired interfit.

BRIEF DESCRIPTION OF THE INVENTION

These and other features of the present invention as well as advantages thereof will become more readily apparent from a reading of the following description with reference to the accompanying drawings in which.

SPECIFIC DESCRIPTION

Figure 1:
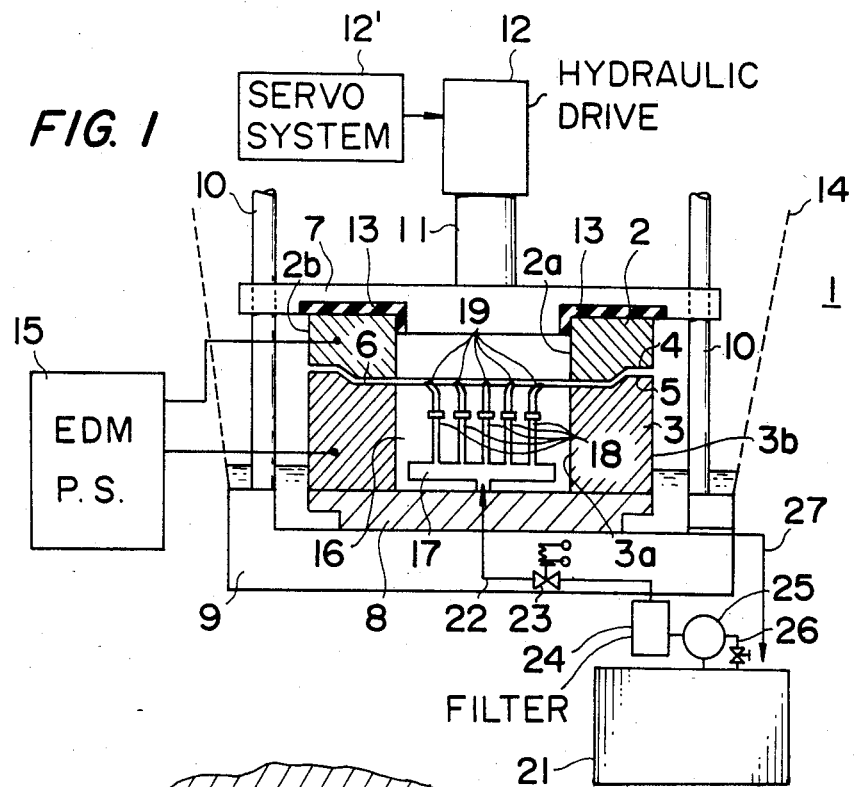
FIG. 1 is a partially side-elevational and partially schematic view diagrammatically illustrating an apparatus according to the present invention.

Referring now to FIG. 1 there is shown an apparatus 1 for finish-machining a pair of interfitting dies, molds or tools, hereinafter generally referred to as members, 2 and 3, by electrical discharge machining (EDM) in accordance with the present invention. The members 2 and 3 have their interfitting surfaces 4 and 5 which may be generally planar or, as shown, formed to be generally complementary and which need be finish-machined to improve their interfit or mutual conformity. In the embodiment illustrated, the members 2 and 3 are each in the form of a ring having an inner cylindrical surface 2a, 3a and an outer cylindrical surface 2b, 3b and, when the surfaces 4 and 5 are interfitted, to form an unitary ring or bored cylinder. The members 2 and 3 are shown spaced apart to form a small gap spacing 6 between the interfitting surfaces 4 and 5 in the vertical direction.

The apparatus preferably utilizes an existing machine in which to utilize the members 2 and 3 finish-machined for forming or pressing and may make use of the existing structure of, say, an ordinary die spotting press as illustrated. Thus, the first member 2, shown to be the upper member, is supported by a first carriage 7 which corresponds to the upper platen of the press and the second member 3, shown to be the lower member is supported on a second carriage 8 which corresponds to the lower platen or table of the press. The second carriage 8 is supported to rest on a base 9 of the machine on which two or four guide posts 10 are securely mounted to guide the first carriage 7 for vertical movement. The first carriage 7 is supported by a connection head 11 which is vertically movable by means of a hydraulic drive unit 12. The upper member 2 is shown as clamped to the first carriage 7 via an electrical insulator 13. The base 9 or table 8 may be provided with side walls, generally shown by broken lines 1, to form a working vessel which is open in the upper direction to accommodate the working zone. Provision is also made of an EDM power supply 15 which has a pair of output terminals electrically connected to the first an second members 2 and 3, respectively, for the purposes of the present invention. The hydraulic drive unit 12 includes a servo system responsive to an electrical parameter representing gap spacing 6 to control the downward displacement of the first member 2 while the second member 3 is held stationary, so that a given minimum distance which, in the presence of an EDM liquid medium allows an electrical discharge to jump, between the surfaces 4 and 5, may be maintained during the machining operation.

Figure 2:
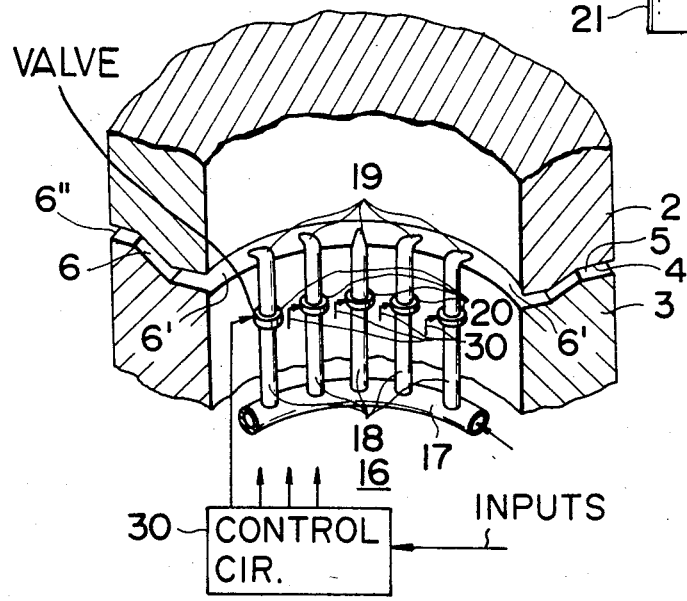
FIG. 2 is a fragmentary perspective view diagrammatically illustrating a portion of the arrangement shown in FIG. 1.

A fluid supply system for controlledly introducing the EDM liquid medium, preferably deionized water or water of a limited electrical conductivity, into a gap spacing 6 which is narrow but large in area includes a fluid delivery assembly 16 which comprises a manifold or fluid distribution chamber 17 and a plurality of tubular nozzles 18 projecting therefrom. The tubular nozzles 18 have fluid delivery nozzle outlets 19 at their respective ends and, as shown in FIG. 2, are provided respectively therein with delivery control valves 20 of electromagnetic type which are operated in a manner as will be described. The manifold 17 communicates with a fluid reservoir 21 via a supply conduit 22 which includes a valve 23, a filter 24 and a pump 25. The pump is operated to draw the EDM liquid medium, e.g. water of a specific resistance of $10^3$ to $10^6$ ohm-cm, stored in the reservoir 21 to feed it under pressure into the manifold 17. The pump 25 is provided with a shunt 26 including a relief valve to return an excess fluid into the reservoir 21. The used machining fluid from the working zone is also returned to the reservoir 21 via a drain conduit 27 arranged to pass through a base portion of the apparatus 1. The supply conduit 22 is likewise arranged to reach the manifold 17.

The manifold 17 may, as can been seen from FIG. 2, be annular and the plural tubular nozzles 18 are shown as arranged to project upwards therefrom in the illustrated embodiment. In general, the fluid delivery assembly 16 comprising the manifold 17 and the tubular nozzles 18 is constructed and arranged so that the nozzle outlets 19 are positioned substantially uniformly spaced apart and evenly distributed in an array closely spaced from, and are individually open to, a continuous slit 6′, that is, the outlet of the gap spacing 6, formed between the two members 2 and 3 where the interfitting surfaces 4 and 5 terminate thereon. In general, when a pair of interfitting surfaces 4 and 5 are separated with a gap spacing 6, a continuous elongate opening or slit 6′ as the outlet of the gap spacing is produced between the separated members 2 and 3 where the interfitting surfaces 4 and 5 terminate and become non-interfitting. In the embodiment illustrated when the two members 2 and 3 to be interfitted are each a ring or bored cylinder, there are formed two such openings or slits 6′ and the nozzle outlets 19 of the tubular nozzles 18 are arranged in a horizontal array along the inner opening or slot 6′ formed between the inner cylindrical, non-interfitting surfaces 2a and 3a flush with each other. Alternatively the array of tubular nozzles 18 or additionally a further array of such nozzles, may be provided outside of the ring members 2 and 3 to position the nozzle outlets 19 along the slot or opening 6″ defined between the outer cylindrical, non-interfitting surfaces 2b and 3b flush with each other, and may project from a manifold 7 which is annular and arranged outside of the ring members 2 and 3.

In accordance with an important feature of the present invention, the electromagnetic valves 20 provided in the tubular nozzles 18 are controlledly actuated and opened, at any one time, to deliver into the slot or opening 6′, 6″ through only one or more but selected nozzle outlets 19 the pressurized EDM liquid medium supplied in the manifold 17 from the reservoir 21 by the pump 24. A control circuit for effectuating this operation is shown at 30 is FIG. 2.

The control circuit 30 may, according to one embodiment of the principles of the invention, be a programmed or number controller adapted to produce a sequence of time-spaced signals for successively energizing and thus opening the valves 20 in a programmed fashion. To this end, the interfitting surfaces 4 and 5 prior to machining may be inspected in conjunction with a final contour of each of the formed surfaces to be eventually interfitted with due conformity. Thus, with respect to each of the surfaces 4 and 5, it is possible to draw a three-dimensional "map" of the initial contour compared with the final three-dimensional contour. The initial formed contour has projections which impede the interfit and hence must be removed to realize the final formed contour. Since at any given time only a single electrical discharge takes place between two opposed surfaces and yet only between the closest points thereon, by comparing the two maps it is possible to predict how electrical discharges in groups will proceed to develop between the surfaces 4 and 5 to be interfitted. It will be noted that the EDM liquid need not be supplied where electrical discharges are not to occur for the time beging. Thus, given any particular combination of two surfaces 4 and 5 to be interfitted, it is possible to determine where between these surfaces electrical discharges being to occur and hence the EDM liquid need begin to be delivered and how between these surfaces the localized area of electrical discharges and hence the area to be flushed with the EDM liquid medium, is to change or to be expanded. Accordingly, the large total area of the narrow gap spacing formed between the surfaces 4 and 5 can be divided into a number of prescribed localized areas or sites, to which a like number of nozzles 18 are respectively assigned. The control circuit 30 may thus be designed to operate responsive to input data or signals to actual the electromagnetic valves 20 in a programmed order to allow the EDM liquid medium in the manifold 17 to be successively delivered to flush these areas in the gap spacing 6 via the corresponding nozzle openings 19.

Figure 3:
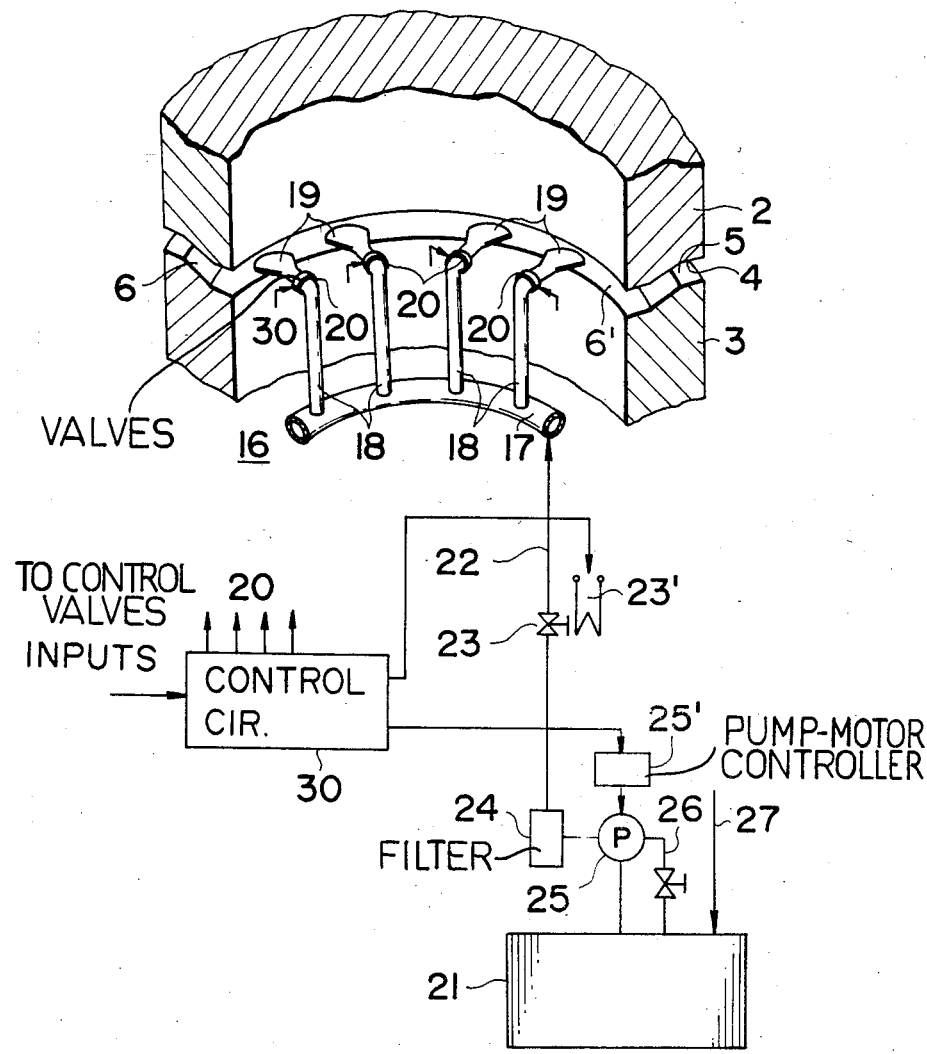
FIG. 3 is a fragmentary perspective and schematic view diagrammatically illustrating a system embodying the present invention.

In general, the area of electrical discharge will expand as the interfitting machining operation proceeds. Thus, for example, after a projection of the highest (relative) altitude A is leveled off to reach a projection of the next highest altitude B, discharges will proceed over both the areas A and B until they are leveled off to reach a projection of the third altitude whereupon discharges will continue over the areas A, B and C. This requires the number of nozzles 18 actuated to be increased stepwise. To meet the need for a stepwise increase of the amount of EDM liquid medium necessary to be supplied from and hence into the manifold 17 from the reservoir 21, as shown in FIG. 3 one or both of the input valve 22 or the pump 25 may be controlled by the control circuit 30. The valve 23 is shown to be again of electromagnetic type having an energizing coil 23'. Each time the number of signals applied from the control circuit to the electromagnetic magnetic valves 20 is increased to increase the number of nozzles 18 actuated, the energizing coil 23' may receive an increasing energization current from the control circuit 30 to increase the degree of the opening of the valve 23 to increase the rate of flow of the EDM liquid into the manifold 17. Alternatively or in addition, the pump 25 may be controlled to change the rate of delivery of the EDM liquid. The pump 25 has a drive motor operated by a driver circuit 25'. Each time the number of nozzles 18 actuated is increased, the control circuit 30 may issue a command signal to the driver circuit 25 to increase the rate of rotation of the pump driving motor, thereby increasing the rate of fluid delivery stepwise.

Figure 4:
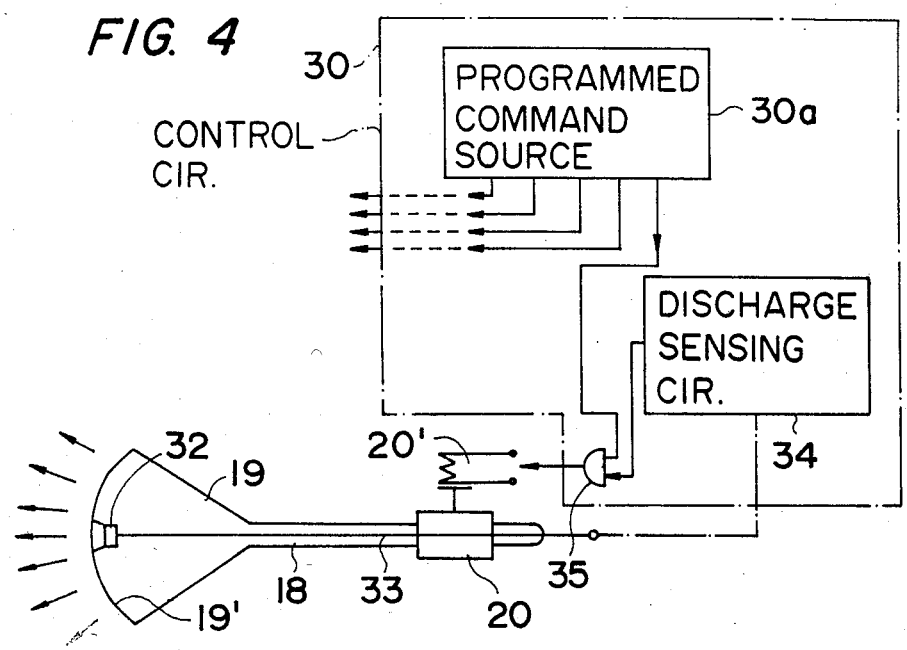
FIG. 4 is a diagrammatic plan view of each nozzle, also including a control circuit schematic, for the explanation of another embodiment of the present invention.

FIG. 3 also shows nozzles 18 which are bent towards the slit 6' and which, as also shown in FIG. 4, have their respective nozzle outlets 19 each in the form of a fan, being vertically thin but horizontally widened towards its forward end 19' which is open to the slit 6'. This modification is intended to increase the area over which the EDM liquid medium is delivered from each of the nozzles 18, and can reduce the number of the nozzles. The arched forward end 19' may be formed with a single nozzle opening extending or a plurality of smaller nozzle openings arranged horizontally to project the EDM liquid medium in the radial direction.

Figure 5:
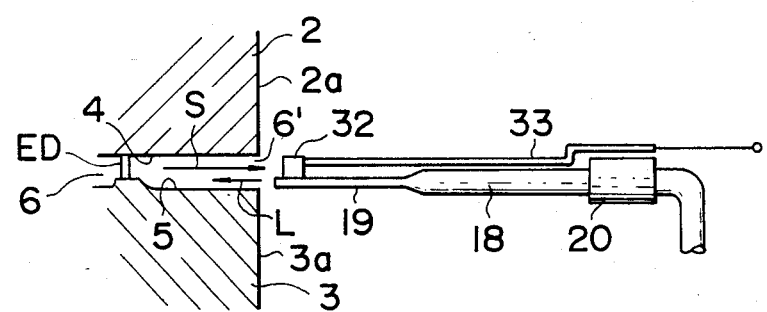
FIG. 5 is a schematic side elevation, partly in section, diagrammatically illustrating the nozzle of FIG. 4 in relation to the interfitting members to be finish-machined according to the invention.

The control circuit 30 may also be designed to issue command outputs for operating the electromagnetic valves 20 responsive to localized electrical discharges in the gap spacing 6. Thus, as shown in FIGS. 4 and 5, each of the fluid delivery nozzles 18 may incorporate a discharge sensor 32 on its outlet end 19'. The discharge sensor 30 may be an optoelectrical transducer responsive to the light of an electrical discharge to produce a corresponding electrical signal. Alternatively, it may be an acoustico-electrical transducer responsive to the sound of an electrical discharge to produce a corresponding electrical signal. As shown in FIG. 5, an optical or acoustic signal S emitted form an electrical discharge ED occurring within an area over which a particular nozzle 18 is prescribed to deliver the EDM liquid medium L is intercepted by the discharge sensor 32 arranged on that particular nozzle. The discharge sensor 30 has an output terminal which is led via a conductor 33 to a sensing circuit 34 provided in the control circuit 30. The sensing circuit 34 comprises an amplifier and an integrator or counter and is adapted to provide an output when a predetermined number of electrical discharges are detected by the discharge sensor 32 in a given time period. The output of the sensing circuit 34 is thus used to verify an output signal from the programmed command source 30a in the control circuit 30. It will be seen that a plurality of sensing circuits 34, the same in number as the nozzles 18, are provided in the control circuit 30, each sensing circuit 34 responding to the transducer 32 on a respective nozzle 18 to provide an output which may be used to control the electromagnetic valve 20 in that particular nozzle 18. The output of the particular sensing circuit 34 is tied with the particular output of the programmed command source 30a at an OR gate 35 whose output is applied to energize the valve coil 20' in the particular nozzle 18. Thus, any one nozzle 18 is allowed to deliver the EDM liquid medium when either the programmed command or the discharge sensing command develops at the input to the OR gate to energize the valve coil 20'.

What is claimed is:
1. A method of making an assembly of a pair of interfitting members having complementary juxtaposed surfaces in mutual conformity to define an annular parting line between said members, comprising the steps of:
positioning a pair of members to place juxtaposed surfaces of said members to be interfitted in a generally interfitting relationship with a small gap spacing therebetween, said gap spacing being annular and defining a parting line upon being closed, said gap spacing having an annular periphery;
disposing a plurality of separate fluid delivery nozzles as to arrange their respective nozzle outlets individually adjacent to, and substantially uniformly distribute them in an annular array along, said periphery and trained into a continuous opening formed as an annular continuous, narrow and elongate outlet opening of said gap spacing defined between said surfaces, said separate nozzles having each a respective valve and commonly projecting from a manifold supplied with a pressurized electrical discharge machining liquid medium;
sequentially opening said valves in a predetermined order determined according to a particular surface characteristic of said surfaces which impedes a desired interfit therebetween, to allow said pressur- ized liquid medium in said manifold to be delivered sequentially to flush therewith particular areas in said gap spacing from the corresponding nozzle outlets while effecting electrical dischrges successively in said areas to sequentially remove said surface characteristic, until said surface establish said desired interfit; and assembling said members so that said surfaces mutually interfit so as to form said parting line.

2. The method defined in claim 1 wherein said nozzles have respective outlet axes generally parallel to said surfaces.

3. The method defined in claim 1 or claim 2 wherein said members are annular, said gap is generally horizontal, and said nozzles are trained generally horizontally outwardly into said gap.

4. An apparatus for machining a pair of interfitting members to improve their mutual conformity, comprising:

means for positioning a pair of members to place their surfaces to be interfitted in a generally interfitting relationship with an annular small gap spacing therebetween, said gap spacing having an annular periphery;

a fluid delivery assembly comprising a manifold adapted to be supplied with a pressurized electrical discharge machining liquid medium from a source thereof and a plurality of separate nozzles having each a respective valve and commonly projecting from said manifold said separate nozzles having their respective nozzle outlets arranged in an annular array so as to be disposed individually adjacent to, and distributed substantially uniformly in said array, along an annular continuous opening along said periphery formed as a continuous, narrow and elongate outlet opening of said gap spacing between said members where said surfaces to be interfitted terminate said nozzles being trained into said opening;

control means for sequentially opening said valves in a predetermined order, determined according to a particular surface characteristic of said surfaces which impedes a desired interfit therebetween, to allow said pressurized liquid medium in said manifold to be delivered sequentially to flush therewith particular areas in said gap spacing from the corresponding nozzle outlets and means for effecting electrical discharges successively in said areas to sequentially remove said surface characteristic until said surfaces establish said desired interfit.

5. The apparatus defined in claim 4 wherein said nozzles have respective outlet axes generally parallel to said surfaces.

6. The apparatus defined in claim 4 or claim 5 wherein said members are annular, said gap is generally horizontal, and said nozzles are trained generally horizontally outwardly into said gap.

* * * * *